(12) United States Patent
Xu et al.

(10) Patent No.: US 10,557,946 B2
(45) Date of Patent: Feb. 11, 2020

(54) GNSS BOARD, TERMINAL AND NARROWBAND INTERFERENCE SUPPRESSION METHOD

(71) Applicant: ComNav Technology Ltd., Shanghai (CN)

(72) Inventors: Min Xu, Shanghai (CN); Xiaodong Zhai, Shanghai (CN)

(73) Assignee: COMNAV TECHNOLOGY LTD., Shanghai (CN)

( * ) Notice: Subject to any disclaimer, the term of this patent is extended or adjusted under 35 U.S.C. 154(b) by 0 days.

(21) Appl. No.: 16/233,305

(22) Filed: Dec. 27, 2018

(65) Prior Publication Data

US 2019/0243003 A1    Aug. 8, 2019

(30) Foreign Application Priority Data

Dec. 29, 2017  (CN) .......................... 2017 1 1488234
Dec. 29, 2017  (CN) .......................... 2017 1 1488235

(51) Int. Cl.
| | |
|---|---|
| *G01S 19/37* | (2010.01) |
| *H04B 1/71* | (2011.01) |
| *G01S 19/42* | (2010.01) |
| *G01S 19/21* | (2010.01) |

(52) U.S. Cl.
CPC .............. *G01S 19/37* (2013.01); *G01S 19/21* (2013.01); *G01S 19/42* (2013.01); *H04B 1/7102* (2013.01)

(58) Field of Classification Search
CPC .......... G01S 19/37; G01S 19/21; G01S 19/42; H04B 1/7102
See application file for complete search history.

(56) References Cited

U.S. PATENT DOCUMENTS 6,470,059 B2 * 10/2002 Starr ...................... H04B 15/02
375/260

* cited by examiner

Primary Examiner — Vineeta S Panwalkar
(74) Attorney, Agent, or Firm — Cantor Colburn LLP

(57) ABSTRACT

A GNSS board comprises a narrowband interference suppression module comprising an interference suppression pathway to receive an intermediate frequency (IF) signal, a bypass pathway to receive an intermediate frequency signal, an interference control switch, and a data strobe switch, wherein, the interference suppression pathway includes a signal conversion module, an interference detection module and an interference processing module, wherein the signal conversion module converts the intermediate frequency signal from a time domain signal to a frequency domain signal; the interference detection module determines whether there is interference with the frequency domain signal, and in the case of interference, obtains interference frequency information, makes the interference control switch close and the data strobe switch switch from the bypass pathway to the interference suppression pathway; and the interference processing module performs interference suppression processing on the frequency domain signal based on the interference frequency signal to obtain an interference-canceled IF signal output by the data strobe switch; the interference detection module makes the interference control switch open and the data strobe switch connect to the bypass pathway in the case of no interference.

19 Claims, 4 Drawing Sheets

GNSS BOARD, TERMINAL AND NARROWBAND INTERFERENCE SUPPRESSION METHOD

CROSS-REFERENCE TO RELATED APPLICATION

The present application claims priority under 35 U.S.C. § 119 to Chinese patent application No. 201711488235.X and 201711488234.5, filed on Dec. 29, 2017, the entirety of both of which is hereby incorporated by reference herein and forms a part of the specification.

BACKGROUND OF THE INVENTION

Field of the Invention

The present invention relates to the field of GNSS technology, and more particularly to a GNSS board, a device, and a narrowband interference suppression method.

Description of the Related Art

Currently, the application of global navigation satellite systems (GNSS) is becoming increasingly popular, however, in practice there still exists the problem of narrowband interference.

BRIEF SUMMARY OF THE INVENTION

In view of this, the present invention provides a GNSS board, a device, and a narrowband interference suppression method.

One aspect of the present invention discloses a GNSS board, comprising a narrowband interference suppression module comprising: an interference suppression pathway to receive an intermediate frequency signal, a bypass pathway to receive an intermediate frequency signal, an interference control switch, and a data strobe switch. The interference suppression pathway includes a signal conversion module, an interference detection module and an interference processing module, wherein the signal conversion module converts the intermediate frequency signal from a time domain signal to a frequency domain signal, the interference detection module determines whether there is interference with the frequency domain signal, and in the case of interference obtains interference frequency information, makes the interference control switch close and the data strobe switch switch from a bypass pathway to an interference suppression pathway, the interference processing module performs interference suppression processing on the frequency domain signal based on the interference frequency signal to obtain an interference-canceled intermediate frequency signal output by a data strobe switch; the interference detection module makes the interference control switch open and the data strobe switch connect to the bypass pathway in case of no interference.

Another aspect of the invention further discloses a device comprising a GNSS board as described above.

Another aspect of the invention further provides a narrowband interference suppression method comprising: providing a GNSS board comprising a bypass pathway and an interference suppression pathway, both of which receive an intermediate frequency signal; the interference suppression pathway detects whether there is interference with the intermediate frequency signal, and in the case of interference turns off the interference suppression pathway and makes the IF signal processed through bypass pathway, and in case of no interference turns off the bypass pathway and performs interference suppression processing to cancel interference.

DETAILED DESCRIPTION OF THE EMBODIMENTS

In order to illustrate in detail the technical content, construction feature, the accomplished purpose and effects of the present invention, detailed description will be made below in connection with embodiments and in cooperation with the accompanying drawings.

Figure 1:
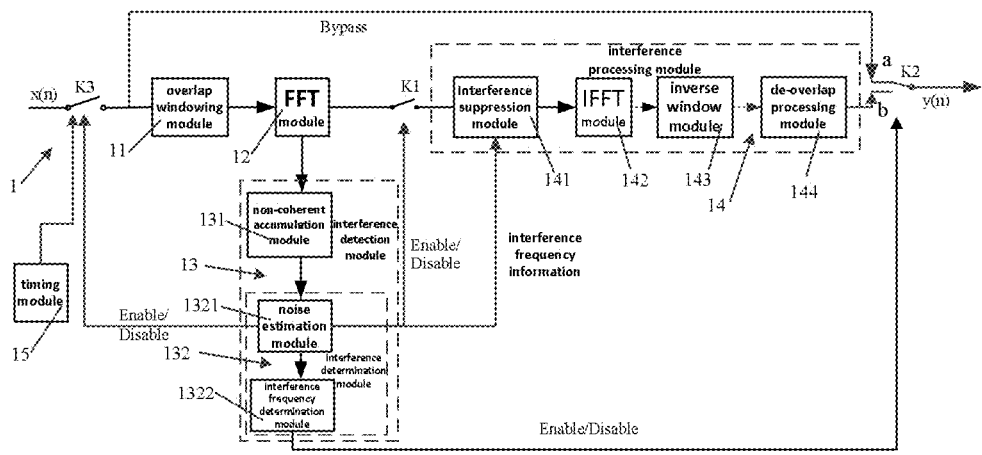
FIG. 1 is a principle block diagram of a narrowband interference suppression module of the present disclosure.

Referring to FIG. 1, a GNSS board (not shown) includes a narrowband interference suppression module including a bypass pathway and an interference suppression pathway. The interference suppression pathway includes a signal conversion module, an interference detection module 13, and an interference processing module. The signal conversion module used to convert the received intermediate frequency signal into a frequency domain signal includes an overlap windowing module 11 and a Fast Fourier Transform (FFT) module 12. The interference processing module 14 used to cancel the interference signal in the IF signal includes the interference suppression module 141, the IFFT module 142, the inverse windowing module 143, and the de-overlap processing module 144 in this embodiment. The overlap windowing module 11 performs an overlap-windowing process on the input IF signal to obtain a windowed signal. The FFT module 12 performs an FFT operation on the windowed signal to obtain a frequency domain signal. The interference detection module 13 includes a non-coherent accumulation module 131 and an interference determination module 132. The non-coherent accumulation module 131 performs a non-coherent accumulation operation on the frequency domain signal to obtain a non-coherent accumulation result comprising signal power, more particularly, for the N-point FFT results of the frequency domain signal, calculates the signal power of all frequencies and performs non-coherent accumulation, and if the number of non-coherent accumulation does not reach a predetermined number, then continues accumulating until the number of non-coherent accumulation reaches a predetermined number, after which the non-coherent accumulation result of all frequencies is transmitted to the interference determination module. The interference determination module 132 performs noise estimation on the non-coherent accumulation result to obtain a noise estimate value, determines whether there is interference with the frequency domain signal based on the noise estimate value and a threshold, and in the case of interference, transmits the interference frequency information of the frequency domain signal to the interference processing module 14.

Figure 2:
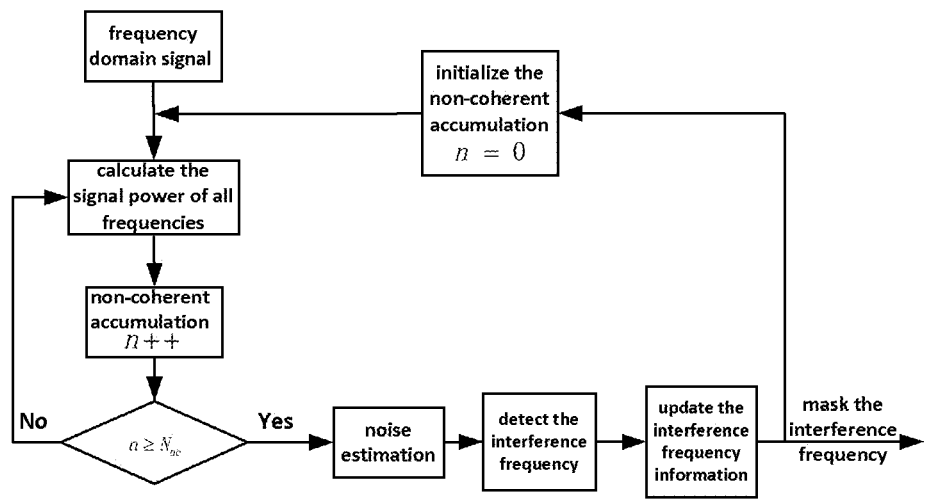
FIG. 2 emphatically illustrates a processing flow of a non-coherent accumulation module of the interference detection module of FIG. 1.

Referring now to FIG. 2 in conjunction with FIG. 1, the operation process of the interference detection module 13, and in particular the non-coherent accumulation module 131, of the present embodiment is illustrated in detail as follows:

1. The non-coherent accumulation parameters are initialized, the non-coherent accumulation number n and the non-coherent accumulation result $P_{nc}$ are initialized to 0:

$$\begin{cases} n = 0; \\ P_{nc} = [P_{nc}(i)] = 0, i = 0 \sim N - 1; \end{cases}$$

2. For the N-point FFT results of the frequency domain signal output by the FFT module 12, the signal power P for each frequency is calculated:

$$P = [P(i)]$$

$$P(i) = \sqrt{I^2(i) + Q^2(i)}, i = 0 \sim N-1$$

3. Non-coherent accumulation is performed, and meanwhile, the non-coherent accumulation results $P_{nc}$ and non-coherent number n are updated;

$$\begin{cases} P_{nc}(i) = P_{nc}(i) + P(i), i = 0 \sim N - 1 \\ n = n + 1 \end{cases}$$

4. Determine whether the non-coherent accumulation number n reaches a set number $N_{nc}$, if not, go back to 2, and wait for the next FFT result;
5. If the non-coherent accumulation number n reaches the set number $N_{nc}$, the non-coherent accumulation result is transmitted to the interference determination module 132. The interference determination module 132 performs noise estimation on the non-coherent accumulation result $P_{nc}$;
6. For the non-coherent accumulation result $P_{nc}$ frequency, the interference determination module 132 detects the interference frequency in conjunction with the estimated noise to obtain a noise estimate value, determines whether there is interference with the frequency domain signal based on the noise estimate result and a threshold, and in the case of interference, transmits the interference frequency information of the frequency domain signal to the interference processing module 14. The method for determining the interference may employ the method described in the second embodiment may also be employed.

With continuing reference to FIG. 1, the interference determination module 132 includes a noise estimation module 1321 and an interference frequency determination module 1322. The noise estimation module 1321 employs an self-adaptive method for noise energy estimation, thus calculating a threshold from the estimated noise energy. That is, the threshold of the interference determination module increases as the non-coherent result increases, and decreases as the non-coherent result decreases. More specifically, The noise estimation module 1321 receives the non-coherent accumulation result of the non-coherent accumulation module, accumulates the last noise estimate value to obtain a current noise estimate value if that frequency is an interference frequency, accumulates the signal power of that frequency to obtain a current noise estimate value if that frequency is not an interference frequency, and calculates an mean value of the noise estimate value after the accumulation of all frequencies is completed, and update the threshold value based on the mean value. The interference frequency determination module compares the non-coherent power of each frequency with the threshold, determines that there is interference at the frequency and updates the interference frequency information if the signal power of the frequency is greater than the threshold, or otherwise determines that there is no interference at the frequency and updates the interference frequency information. With the noise estimation module 1321 described above, the threshold can be automatically adjusted according to the change in the interference with changing intensity and frequency, thereby ensuring the accuracy of the detection. Especially if the noise estimation module 1321 is used with the non-coherent accumulation module 131, not only the sensitivity can be increased, but also the accuracy of the detection can be insured.

Figure 3:
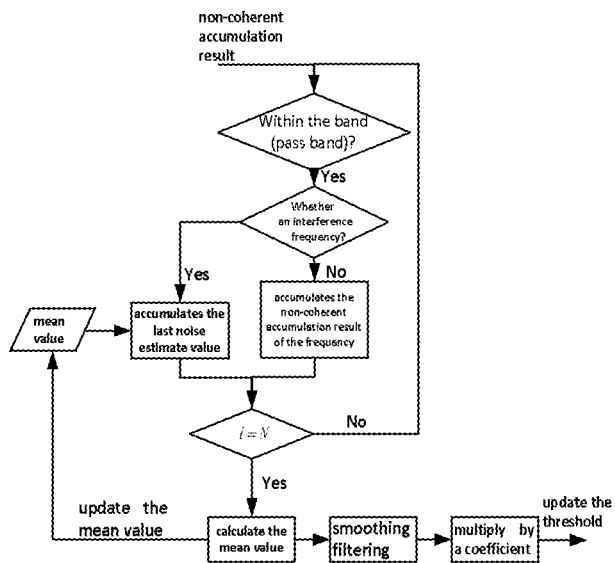
FIG. 3 emphatically illustrates a processing flow of an interference determination module of the interference detection module of FIG. 1.

Referring to FIG. 3, the above described interference determination module 132 operates as follows:

1. Input the non-coherent accumulation result $P_{nc}$ after the frequency domain signal experiences the non-coherent accumulation, and initialize the interference decision threshold T and the noise estimate value $N_{acc}$;

$$\begin{cases} T = 0 \\ N_{acc} = 0 \end{cases}$$

2. Determine whether the $i^{th}$ frequency is within the band, is it is in-band frequency, then go to 3, if not, then i=i+1 and continues to determine the next frequency;
3. Continuing to determine whether the i th frequency is an interference frequency, if not, then accumulates the signal power $P_{nc}(i)$ of that frequency, and if it is, then the last noise estimate value $\hat{N}_{mean}$ is accumulated;

$$N_{acc} = \begin{cases} N_{acc} + P_{nc}(i), & i \in \text{non-interference frequency point} \\ N_{acc} + \hat{N}_{mean}, & i \in \text{interference frequency point} \end{cases}$$

4. Determine whether the accumulation of all the N frequencies are completed, continue with 5 if completed, otherwise skip back to 2, i=i+1 and continue to determine the next frequency;
5. When accumulation of all the N frequencies is finished, obtain the mean value (pre-noise estimate value) $N_{mean}$ of the noise estimate value;

$$N_{Mean} = N_{acc}/N$$

6. The noise estimation module 1321 performs smoothing filtering on the current noise estimate value;

$$N_{filter} = \hat{N}_{mean} + \frac{N_{mean} - \hat{N}_{mean}}{k},$$

k is a constant

7. Update the last estimated noise value $\hat{N}_{mean}$;

$$\hat{N}_{mean}=N_{mean}$$

8. Update the threshold T by multiplying the estimated noise by a specified coefficient.

$$T=r*N_{filter}, r \text{ is a constant}$$

With continuing reference to FIG. 1, in the case of interference, the interference processing module 14 receives the frequency domain signal and performs an interference suppression processing on the frequency domain signal based on the interference frequency information to cancel the interference of the intermediate frequency signal. In this implementation, the interference processing module 14 includes an interference suppression module 141, an IFFT module 142, an inverse window module 143, and a de-overlap processing module 144. In the case of interference, the interference suppression module 141 performs interference suppression processing on the received interference frequency signal based on the interference frequency information from the interference determination module 132 to obtain interference-suppressed frequency domain signals. The IFFT module 142 converts the interference-suppressed frequency domain signal into the time domain through an IFFT. The inverse window module 143 performs an inverse windowing function process on the time domain signal. The de-overlap processing module 144 performs de-overlap processing on the time domain signal that has experienced inverse window processing to eventually resulting in an interference-canceled intermediate frequency signal.

Figure 4:
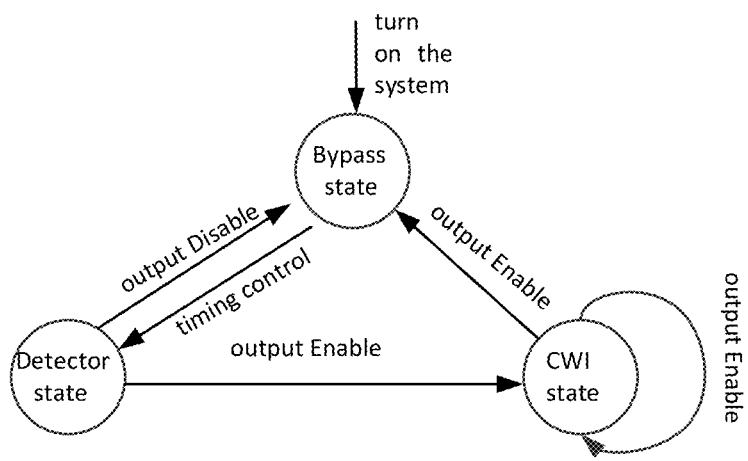
FIG. 4 is a state transition diagram of the narrowband interference suppression module of the implementation shown in FIG. 1.
Figure 5:
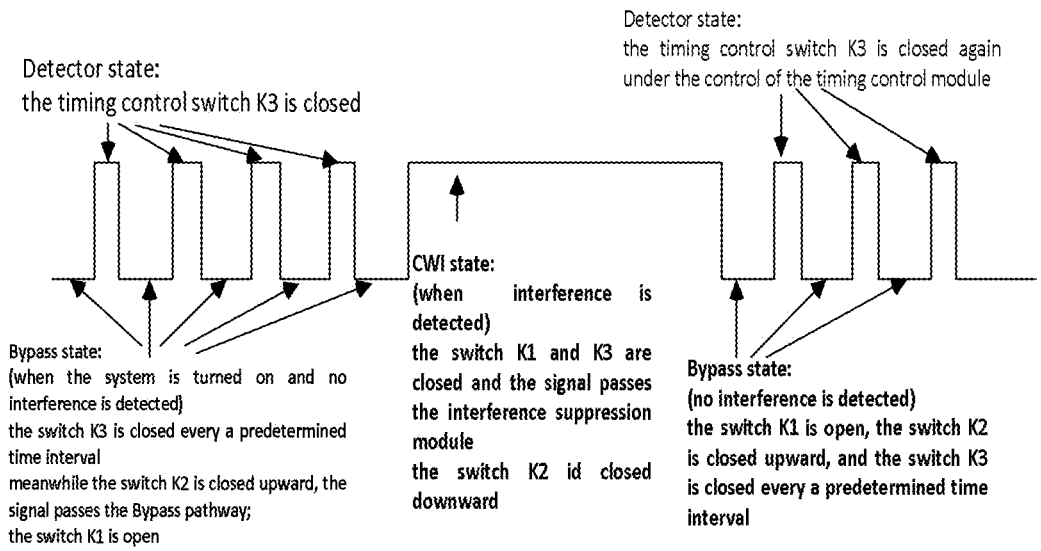
FIG. 5 is a timing diagram of the operation state of the narrowband interference suppression module shown in FIG. 1.

With continuing reference to FIG. 1 and in conjunction with FIG. 4 and FIG. 5, the interference suppression module includes an interference control switch K1, a data strobe switch K2, a timing control switch K3, and a timing module 15. The interference control switch K1 has a default state of open, and is only controlled by the interference enabling signal of the interference detection module 13. The interference control switch K1 is closed if the interference enabling signal is active, and is open if the interference enabling signal is inactive. The data strobe switch K2 has a default state of connecting to a bypass pathway, and is also only controlled by the strobe enable signal output by the interference detection module 13, such that in the case of interference, the strobe enable signal is active thereby enabling the data strobe switch to connect to the output end of the interference processing module 14 thus outputting the interference-suppressed intermediate frequency signal from b, and in the case of no interference, the strobe enable signal is inactive thereby enabling the data strobe switch K3 to connect to a thus cause the intermediate frequency signal to be output from the bypass pathway. The timing module 15 asserts the output timing enabling signal every predetermined time interval. The timing control switch K3 has a default state of open, and is collectively controlled by the enable signals output by the timing module 15 and the interference detection module 13. Specifically, the timing control switch K3 is open only if there is no interference and the time interval for closing does not reach a predetermined time interval, in which case the intermediate frequency signal is output after being processed by the bypass pathway. Otherwise, the timing control switch is closed, in which case the intermediate frequency signal is transmitted to the signal conversion module. The closing/opening control of timing control switch K3 is shown in the following table:

TABLE 1

The control of closing and opening of the timing control switch K3

| The output of the timing module | The output of the interference detection module | The state of K3 |
| --- | --- | --- |
| 1 | Enable | closed |
| 1 | Disable | closed |
| 0 | Enable | closed |
| 0 | Disable | open |

As can be seen from the above table 1, the timing control switch K3 is open only if there is no interference and the closing time interval has not reached the predetermined time interval, in which case the intermediate frequency signal is output after being processed by the bypass pathway. Otherwise, the timing control switch is closed, in which case the intermediate frequency signal is transmitted to the signal conversion module. More specifically, the output interference enabling signal is active and the interference frequency information is transmitted to the interference suppression module 141 when the interference detection module determines that there is interference with the intermediate frequency signal. The timing enabling signal output by the timing module is active if the recorded time interval reaches a predetermined time, and the timing control switch is closed if the interference enabling signal is active and the timing enabling signal is active. Alternatively, the interference enabling signal output by the interference detection module is inactive in the case of no interference, and the timing control switch is closed if the interference enabling signal is inactive and the timing enabling signal is active. Alternatively, the timing enabling signal output by the timing module is inactive if the recorded time does not reach a predetermined time interval, the interference enabling signal output by the interference detection module is inactive in the case of no interference, and the timing control switch is open if the timing enabling signal is inactive and the interference enabling signal is inactive. Alternatively, the timing enabling signal output by the timing module is inactive if the recorded time does not reach a predetermined time interval, the interference enabling signal output by the interference module is active in the case of interference, and the timing control switch is closed if the interference enabling signal is active and the timing enabling signal is inactive.

Referring now to FIG. 4, FIG. 5 and FIG. 1, in FIG. 1, the interference suppression module has two data pathways, being a bypass pathway and an interference suppression pathway, respectively. The bypass pathway refers to a data pathway where the input intermediate frequency signal data is directly output without any module processing of the interference suppression module, and the interference suppression pathway refers to the data pathway where the input intermediate frequency signal data is output after being processed by all modules of interference suppression. The input intermediate frequency signal data of the interference suppression module is duplicated into two copies, respectively passing these two pathways that have the same delay, so the data output by the whole module at the time the data strobe switch K2 switches is the fully seamless interference-canceled intermediate frequency signal data. These two data pathways are under the control of the interference control switch K1, the data strobe switch K2 and the timing control switch K 3, and the whole module can be in the Bypass state, the Detector state, or the CWI state, as shown in FIG. 7A through FIG. 7D. The Bypass state refers to the module state where the input intermediate frequency signal data is output directly through the Bypass pathway without any processing of the interference suppression module; the Detector state refers to the module state where the input intermediate frequency signal data arrives at the interference detection module and initiates the interference detection function, and the intermediate frequency signal data is still output by the Bypass pathway if the interference has not been detected; the CWI state refers to the module state where the input intermediate frequency signal data passes through the interference detection module and then through the interference suppression filtering module, and finally through the de-overlap processing module, and output through the interference suppression pathway.

With continuing reference to FIG. 4, FIG. 5, and in conjunction with FIG. 1, during operation, the converting of the operating state of modules is controlled by the interference suppression module through the three switches in FIG. 1. The transition flow of three operating states are as follows:

in the first step, after the module is turned on, the timing control switch K3 and the interference control switch K1 is open, the data strobe switch K2 is closed to connect to the end a, the digital intermediate frequency signal data is output through the Bypass pathway, and the module is in the Bypass state for a period of time, then enter into the next step;

in the second step, after a period of time, the timing control switch K3 is closed, the interference control switch K1 is still open, and the data strobe switch K2 is closed to connect to the end a. The digital intermediate frequency signal data arrives at the interference detection module 13, because of which the interference detection module 13 is turned on and stays in the Detector state, which is the transition state of the module. The module returns to the Bypass state and continues to cycle from the first step when no interference is detected, and the module enters the CWI state when interference is detected;

in the third step, the timing control switch K3 and the interference control switch K1 are closed, and the data strobe switch K2 is closed to connect to the end b, while the module is in the CWI state. If the interference detection module detects that the number of interference does not exceed the predetermined threshold, the module returns to the Bypass state and continues to cycle from the first step, otherwise the module remains in the CWI state.

According to the operation of the various modules of the interference suppression module in the three states, the power consumption of the modules varies significantly in different operation states. The power consumption of the Bypass state, the Detector state and the CWI state is in the ascending order, wherein the power consumption of the interference suppression module in the Bypass state is negligible, the power consumption of the interference suppression module in the CWI state is maximum, and the power consumption in the Detector state is therebetween.

Figure 6:
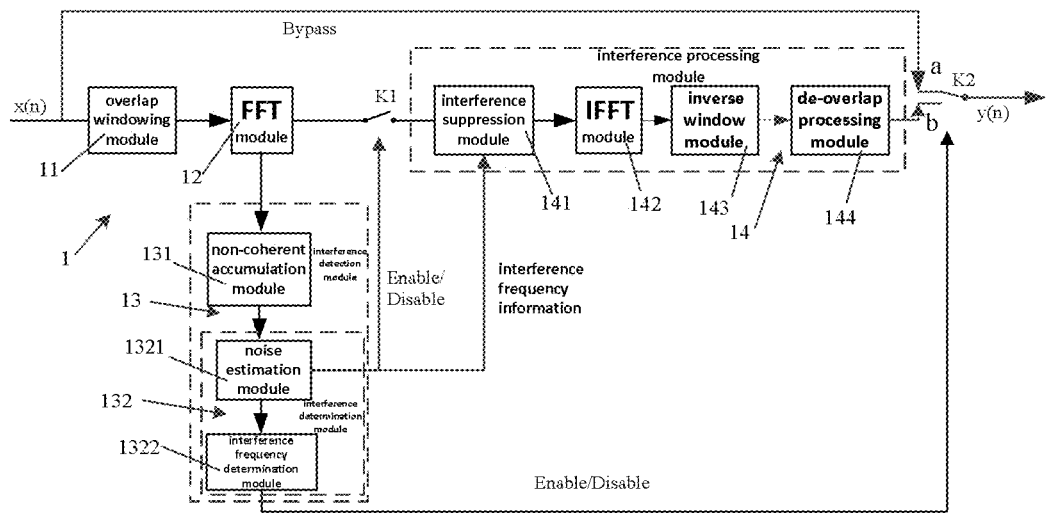
FIG. 6 is a principle diagram of a second implementation of a narrowband interference suppression module of the present invention.

Referring to FIG. 6, which is a second implementation of power consumption control of the present invention, the same operation process of which is not given unnecessary details, and the differences are described as follows:

The interference control switch K1 has a default state of open. The data strobe switch K2 has a default state of connecting the bypass pathway. The frequency domain signal processed at the FFT module is first transmitted to the non-coherent accumulation module 131 where the signal experiences non-coherent accumulation and then transmitted to the interference determination module 132. The interference determination module 132 determines whether there is interference with the non-coherent accumulation result. In the case of no interference, the produced interference enabling signal is inactive and the strobe enable signal is inactive. The interference control switch K1 is open under the control of the inactive enable signal. The data strobe switch K2 connects the bypass pathway under the control of the strobe inactive enable signal. In the case of interference, the interference determination module 132 produces the interference enabling signal and the strobe enable signal, while transmitting the interference frequency information to the interference suppression module 141. The interference control switch K1 is closed under control of the interference enable active signal. The data strobe switch K3 is connected to the output end of the interference processing module 141 under the control of the strobe enable active signal. The frequency domain signal is transmitted to the interference suppression module 141 if the interference control switch K1 is closed. The interference suppression module 141 performs interference suppression processing based on the interference frequency information from the interference determination module 132 of the interference detection module 13. The operation processes of the IFFT module 142, the inverse window module 143, and the de-overlap processing module 144 are described above, which are not given unnecessary details herein.

Referring now to FIG. 5, the power consumption analysis of the two implementations is as follows:

Two power consumption control schemes result in the module being in three different operating states, the module optimizes the total power consumption of the module by the switching between three operating states with different power consumption when the module is under some complex interference environment.

Firstly, the module is turned on, and initialized to the Bypass state. The timing control module controls switch K3 to close every a predetermined time interval of $t_1$ second. the module starts to enter the Detector state, duration of which is $t_2$ seconds. The interference detection module detects whether there is interference, and if not, the interference detection module outputs Disable signal to cause switch K1 and K3 to open, return to the Bypass state and K3 continue to wait for the next predetermined time interval to close. In FIG. 5, no interference is detected after switch K3 is closed within the first 4 time intervals. After the timing control module opens the switch K3 at the $5^{th}$ time interval, the interference detection module detects interference, and the module enters the CWI state. The power consumption in this process is $$P_1 = 5 * t_1 * p_B + 4 * t_2 * p_D;$$

wherein $p_B$ is the power consumption of the module's Bypass state, and $p_D$ is the power consumption of the module's Detector state.

Then, the module stays in the CWI state for a duration of $t_2$ seconds due to the closing of switch K3. The interference detection module continues detecting the input intermediate frequency data until the number of times no interference is detected exceeds a predetermined threshold, when the interference detection module controls the switches K1 and K3 to open and returns to the Bypass state. The power consumption in this process is $$P_2 = t_3 * p_C;$$

where $p_C$ is the power consumption when the module is in CWI state.

Finally, after the module returns to the Bypass state, the switch K3 continues to wait for the next time interval to close, and to cause the module to enter the Detector state. The interference detection module re-detects whether there is interference, and continues the above process, and so on. The power consumption of the entire module may therefore be represented as $$P=P_1+P_2+\ldots$$

On one hand, due to the Bypass state the power consumption $p_B$ of interference suppression module is negligible. On the other hand, the duration $t_2$ of the Detector state is negligible compared to the entire working duration of the module, so finally the power consumption of the module may be approximate to the power consumption of the CWI state:

$$P \approx P_2;$$

That is, when all of the power consumption of the module is used for the purpose of interference suppression. So when there is no interference, little power consumption is produced by the module, thus achieving the purpose of power control of the interference suppression module.

Figure 7A:
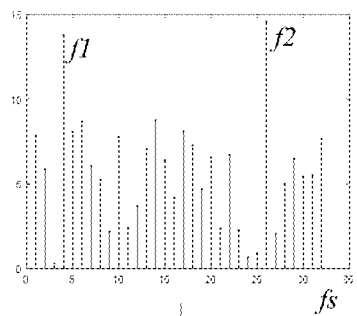
FIG. 7A through FIG. 7D are a schematic diagrams of a sensitivity analysis of non-coherent accumulation of the interference detection module of FIG. 1 or FIG. 6.
Figure 7B:
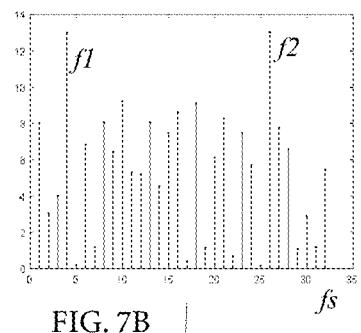
Figure 7C:
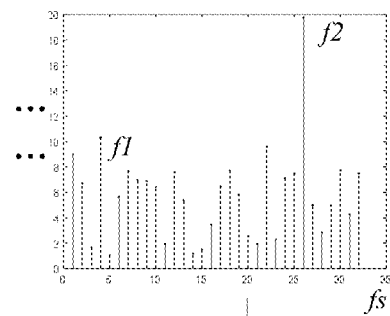
Figure 7D:
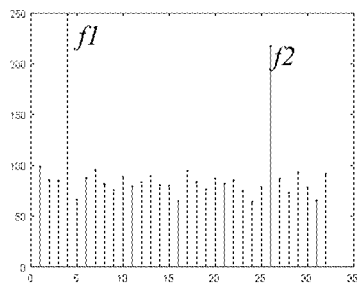

Referring to FIG. 7A through FIG. 7D, the interference detection module of the present embodiment performs interference frequency detection mainly using a non-coherent accumulation algorithm of the frequency-domain signal. After the non-coherent accumulation of the interference frequency that originally hid in the noise and without a protruded peak, the non-coherent accumulation causes the interference frequency peak to be protrude, which contributes to improving the accuracy and sensitivity of the detection of weak interference signals. More, specifically, after the FFT transform, since the ratio of the interference signal to the noise mean is not outstanding, for frequencies $f_1$ and $f_2$ with frequency domain peaks that are not very obvious, it is hard for them to be detected as interference frequencies. However, after several times of non-coherent integration ($7a+7b+7c+\ldots$), the energy of the interference frequency is gradually increased and becoming stable. As shown in FIG. 7D, the values of the frequencies $f_1$ and $f_2$ become larger than the threshold after several times of non-coherent integration, thereby being detected.

To some extent, as the number of times of non-coherent integration increases, the more stable the signal-to-interference ratio, the better the sensitivity of the detection of interference signal. But when the number of times of non-coherent integration increases excessively, the increase of the sensitivity of the detection of interference signal is limited, instead, it results in some overhead and power consumption of hardware resources. When the number of times of non-coherent integration is 1, it degrades to the simplest interference detector with the weakest sensitivity for the detection of interference signal. Therefore, in practical applications, considering the performance and resource overhead, the number of times of non-coherent accumulation are configured as an empirical value that, after verified by simulation tests, can be set to 64, such as 1, 2, 5, 7, 11, 15, 16, 18, 20, 25, 27, 29, 35, 39, 43, 48, 52, 55, 57, 59, 61, 63, 64, and the like.

Furthermore, a device (not shown) includes the GNSS board of mentioned-above.

What is claimed is:

1. A Global Navigation Satellite System (GNSS) board, comprising a narrowband interference suppression module, the narrowband interference suppression module comprising:

an interference suppression pathway, receiving an intermediate frequency signal, a bypass pathway, receiving the intermediate frequency signal, an interference control switch, and a data strobe switch, wherein, the interference suppression pathway comprises a signal conversion module, an interference detection module and an interference processing module, wherein, the signal conversion module converts an intermediate frequency signal from a time domain signal to a frequency domain signal;

the interference detection module determines whether there is interference with the frequency domain signal, and in the case of interference, the interference detection module obtains interference frequency information, the interference detection module controls the interference control switch being closed and the data strobe switch being switched from the bypass pathway to the interference suppression pathway; and the interference processing module performs interference suppression processing on the frequency domain signal based on the interference frequency signal to obtain an interference-canceled intermediate frequency signal output by the data strobe switch;

in the case of no interference, the interference detection module makes the interference control switch open and the data strobe switch connect to the bypass pathway.

2. The Global Navigation Satellite System (GNSS) board of claim 1, wherein the interference suppression module comprises a timing control switch and a timing module, wherein the timing module records a time interval at which the timing control switch is open, the timing control switch is open only in the case of no interference and the time interval for closing does not reach a predetermined time interval. In case that the timing control switch is open, the intermediate frequency signal is output after being processed by the bypass pathway; otherwise, the timing control switch is closed, in which case the intermediate frequency signal is transmitted to the signal conversion module.

3. The Global Navigation Satellite System (GNSS) board of claim 2, wherein the output interference enabling signal is active if the interference detection module determines that there is interference with the intermediate frequency signal, the timing module outputs the active timing enabling signal if the recorded time interval reaches a predetermined time, the timing control switch is closed under the control of the active interference enabling signal and the active timing enabling signal.

4. The Global Navigation Satellite System (GNSS) board of claim 2, wherein the interference enabling signal output by the interference detection module is inactive in the case of no interference, and the timing control switch is closed if the interference enabling signal is inactive and the timing enabling signal is active.

5. The Global Navigation Satellite System (GNSS) board of claim 2, wherein the timing enabling signal output by the timing module is inactive if the recorded time does not reach a predetermined time interval, the interference enabling signal output by the interference detection module is inactive in the case of no interference, and the timing control switch is open if the timing enabling signal is inactive and the interference enabling signal is inactive.

6. The Global Navigation Satellite System (GNSS) board of claim 2, wherein the timing enabling signal output by the timing module is inactive if the recorded time does not reach a predetermined time interval, the interference enabling signal output by the interference module is active in the case of interference, and the timing control switch is closed if the interference enabling signal is active and the timing enabling signal is inactive.

7. The Global Navigation Satellite System (GNSS) board of claim 1, wherein the interference detection module comprises a non-coherent accumulation module and an interference determination module, wherein the non-coherent accumulation module performs a non-coherent accumulation operation on the frequency domain signal to obtain a non-coherent accumulation result that includes signal power, the interference determination module performs noise estimation on the non-coherent accumulation result to obtain a noise estimate value, and determines whether there is interference with the frequency domain signal based on the noise estimate result and a threshold, the interfering frequency information of the frequency domain signal is transmitted to the interference processing module;

in the case of interference, the interference processing module receives the frequency domain signal and performs an interference suppression process on the frequency domain signal based on the interference frequency information to cancel the interference of the intermediate frequency signal.

8. The Global Navigation Satellite System (GNSS) board of claim 7, wherein the non-coherent accumulation module calculates the signal power of all frequencies and performs non-coherent accumulation for the N-point Fast Fourier Transform (FFT) results of the frequency domain signal, and if the number of non-coherent accumulation does not reach a predetermined number, then continues accumulating until the number of non-coherent accumulation reaches a predetermined number, after which the non-coherent accumulation result of all frequencies is transmitted to the interference determination module.

9. The Global Navigation Satellite System (GNSS) board of claim 8, wherein the predetermined number is between 1 and 64.

10. The Global Navigation Satellite System (GNSS) board of claim 7, wherein the threshold of the interference determination module increases as non-coherent results increase and decreases as non-coherent results decrease.

11. The Global Navigation Satellite System (GNSS) board of claim 7, wherein the interference determination module comprises a noise estimation module and an interference frequency determination module, wherein the noise estimation module receives the non-coherent accumulation result of the non-coherent accumulation module, accumulates the last noise estimate value to obtain a current noise estimate value if that frequency is an interference frequency, and accumulates the signal power of that frequency to obtain a current noise estimate value if that frequency is not an interference frequency, and calculates a mean value of the noise estimate value after the accumulation of all frequencies is completed, and update the threshold based on the mean value; the interference frequency determination module compares the non-coherent power of each frequency with the threshold, determines that there is interference at the frequency and updates the interference frequency information if the signal power of that frequency is greater than the threshold, or otherwise determines that there is no interference at the frequency and updates the interference frequency information.

12. The Global Navigation Satellite System (GNSS) board of claim 1, wherein the interference determination module outputs an active interference enabling signal and an active strobe enable signal if interference is detected;

the interference control switch receives the active interference enabling signal and closes, and transmits the frequency domain signal to the interference processing module;

the data strobe switch is connected to the bypass pathway and an output end of the interference processing module, receives the active strobe enable signal to output a result of the interference processing module;

the interference detection module produces an output of an inactive interference enabling signal and an inactive strobe enable signal if no interference is detected, wherein the interference control switch is closed under the control of the inactive interference enabling signal; the data strobe switch is closed to connect to the bypass pathway under the control of the inactive strobe enable signal and output the intermediate frequency signal.

13. A device comprising a Global Navigation Satellite System (GNSS) board, the Global Navigation Satellite System (GNSS) board comprises a narrowband interference suppression module, the narrowband interference suppression module comprising:

an interference suppression pathway, receiving an intermediate frequency signal, a bypass pathway, receiving the intermediate frequency signal, an interference control switch, and a data strobe switch, wherein, the interference suppression pathway comprises a signal conversion module, an interference detection module and an interference processing module, wherein, the signal conversion module converts an intermediate frequency signal from a time domain signal to a frequency domain signal;

the interference detection module determines whether there is interference with the frequency domain signal, and in the case of interference, the interference detection module obtains interference frequency information, the interference detection module controls the interference control switch being closed and the data strobe switch being switched from the bypass pathway to the interference suppression pathway; and the interference processing module performs interference suppression processing on the frequency domain signal based on the interference frequency signal to obtain an interference-canceled intermediate frequency signal output by the data strobe switch;

in the case of no interference, the interference detection module makes the interference control switch open and the data strobe switch connect to the bypass pathway.

14. A narrowband interference suppression method, comprising:

providing a Global Navigation Satellite System (GNSS) board comprising a bypass pathway and an interference suppression pathway, the bypass pathway and the interference suppression pathway each receiving an intermediate frequency signal;

the interference suppression pathway detects whether there is interference with the intermediate frequency signal, and in the case of no interference, turns off the interference suppression pathway and controls the intermediate frequency signal to experience bypass pathway processing, and in the case of interference, turns off the bypass pathway and performs interference suppression processing to cancel interference.

15. The narrowband interference suppression method of claim 14, wherein the interference suppression process comprises:

converting an input intermediate frequency signal into a frequency domain signal;

performing a non-coherent accumulation operation on the frequency domain signal to obtain a non-coherent accumulation result comprising signal power;

performing noise estimation on the non-coherent accumulation result to obtaining a noise estimate value;

determining whether there is interference with the frequency domain signal based on the noise estimate result and a threshold; and in the case of interference, obtaining the interference frequency information of the frequency domain signal and transmitting it to the interference suppression pathway to perform interference suppression process to cancel the interference in the intermediate frequency signal.

16. The narrowband interference suppression method of claim 15, wherein the non-coherent accumulation specifically comprises:

calculating the signal power of all frequencies based on an N-point Fast Fourier Transform (FFT) result of the frequency domain signal and performing non-coherent accumulation;

if the number of times of non-coherent accumulation does not reach a predetermined number, continuing to accumulate until the number of times of non-coherent accumulation reaches a predetermined number, after which non-coherent accumulation results for all frequencies are transmitted for performing the noise estimation.

17. The narrowband interference suppression method of claim 16, wherein the predetermined number is between 1 and 64.

18. The narrowband interference suppression method of claim 15, wherein performing noise estimation on the non-coherent accumulation result to obtain a noise estimate value comprises:

receiving a determination result of an interference frequency determination module;

accumulates the last noise estimate value to obtain a current noise estimate value if that frequency is an interference frequency, and accumulates the signal power of that frequency to obtain a current noise estimate value if that frequency is not an interference frequency, and calculates a mean value of the noise estimate value after the accumulation of all frequencies is completed, and update the threshold based on the mean value.

19. The narrowband interference suppression method of claim 14, further comprising:

setting a time interval for receiving the intermediate frequency signal;

controlling the intermediate frequency signal to transmit to the bypass pathway only if the time interval for receiving the intermediate frequency signal does not reach the predetermined time interval and no interference is detected, otherwise, the intermediate frequency signal is processed by the interference suppression pathway.

* * * * *